(12) United States Patent
Cha et al.

(10) Patent No.: US 9,904,133 B2
(45) Date of Patent: Feb. 27, 2018

(54) LIQUID CRYSTAL DISPLAY

(71) Applicant: Samsung Display Co., Ltd., Yongin, Gyeonggi-Do (KR)

(72) Inventors: Hyun Seung Cha, Yongin-si (KR); Kwang Bae Park, Suwon-si (KR); Won Jin Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 25 days.

(21) Appl. No.: 14/282,309

(22) Filed: May 20, 2014

(65) Prior Publication Data
US 2015/0009463 A1    Jan. 8, 2015

(30) Foreign Application Priority Data

Jul. 3, 2013  (KR) .................. 10-2013-0078063

(51) Int. Cl.
*G02F 1/1362* (2006.01)

(52) U.S. Cl.
CPC .............................. *G02F 1/136259* (2013.01)

(58) Field of Classification Search
CPC ... G02F 1/136259; G02F 2001/136263; G02F 2001/136268; G02F 2001/136272; G02F 1/134363

See application file for complete search history.

(56) References Cited

U.S. PATENT DOCUMENTS

| 5,995,178 | A | 11/1999 | Fujikawa et al. |
| 6,118,508 | A * | 9/2000 | Park ............... G02F 1/134363 349/141 |
| 6,801,293 | B1 | 10/2004 | Nishiyama et al. |
| 7,209,194 | B2 | 4/2007 | Suzuki et al. |
| 8,154,021 | B2 | 4/2012 | Choi et al. |
| 2004/0125300 | A1* | 7/2004 | Lee ............... G02F 1/134363 349/141 |
| 2007/0153197 | A1* | 7/2007 | Park ............... G02F 1/134363 349/141 |
| 2007/0158655 | A1 | 7/2007 | Lin |
| 2007/0263134 | A1 | 11/2007 | Kim et al. |
| 2009/0066869 | A1* | 3/2009 | Wu ............... G02F 1/136259 349/39 |
| 2013/0126876 | A1* | 5/2013 | Shin ............... H01L 29/6675 257/59 |
| 2013/0215354 | A1* | 8/2013 | Yoon ............... G02F 1/1309 349/46 |

FOREIGN PATENT DOCUMENTS

| JP | 10-104648 A | 4/1998 |
| JP | 2002221736 A | 8/2002 |

(Continued)

*Primary Examiner* — Jessica M Merlin
(74) *Attorney, Agent, or Firm* — Cantor Colburn LLP

(57) ABSTRACT

A liquid crystal display includes an insulation substrate, a gate line and a data line disposed on the insulation substrate, a repair pattern disposed on the insulation substrate, a first passivation layer disposed on the gate line, the data line and the repair pattern and a pixel electrode and a common electrode that is disposed on the first passivation layer and that overlap each other, and a second passivation layer disposed between the pixel electrode and the common electrode where the repair pattern overlaps the pixel electrode.

21 Claims, 12 Drawing Sheets

(56) References Cited

FOREIGN PATENT DOCUMENTS

| | | |
|---|---|---|
| JP | 2008-058573 A | 3/2008 |
| JP | 2009053658 A | 3/2009 |
| JP | 2009-128552 A | 6/2009 |
| JP | 2009151094 A | 7/2009 |
| JP | 2010145667 A | 7/2010 |
| JP | 2011100170 A | 5/2011 |
| JP | 2011128618 A | 6/2011 |
| JP | 2012103343 A | 5/2012 |
| JP | 2013109347 A | 6/2013 |
| KR | 1020070068194 A | 6/2007 |
| KR | 1020070068195 A | 6/2007 |

* cited by examiner

LIQUID CRYSTAL DISPLAY

This application claims priority to Korean Patent Application No. 10-2013-0078063 filed on Jul. 3, 2013, and all the benefits accruing therefrom under 35 U.S.C. § 119, the entire contents of which are incorporated herein by reference.

BACKGROUND (a) Field

The invention relates to a liquid crystal display.

(b) Description of the Related Art

A liquid crystal display is one of flat panel displays most widely used and includes a display device that rearranges liquid crystal molecules of a liquid crystal layer by applying voltages to electrodes so as to control an amount of transmitted light.

The liquid crystal display has an advantage of easily being thinned, but has a disadvantage of having low side visibility in comparison with front visibility. Accordingly, a method of arranging and driving liquid crystals in various methods in order to overcome the disadvantage has been developed. As a method of realizing an optical viewing angle, the liquid crystal display in which a pixel electrode and a common electrode are formed on one substrate is spotlighted.

A driver of the liquid crystal display is directly mounted to a display panel in a form of a plurality of integrated circuit ("IC") chips or is mounted to the display panel by being mounted to a flexible circuit film or the like, and the IC chips account for a large percentage of manufacturing costs of the liquid crystal display. Particularly, as the number of data lines applying data voltages becomes larger, costs of the driver of the liquid crystal display become higher.

SUMMARY

The invention has been made in an effort to provide a liquid crystal display which can repair bad pixels while effectively preventing aperture ratio deterioration of the liquid crystal display and effectively reduce the number of data lines while effectively reducing a signal delay of a common voltage line so as to effectively reduce costs of a driver of the liquid crystal display.

An exemplary embodiment of the invention provides a liquid crystal display including an insulation substrate, a gate line and a data line disposed on the insulation substrate, a repair pattern disposed on the insulation substrate, a first passivation layer disposed on the gate line, the data line and the repair pattern, and a pixel electrode and a common electrode disposed on the first passivation layer and overlapping each other with a second passivation layer therebetween, wherein the repair pattern overlaps the pixel electrode.

The liquid crystal display may further include a common voltage line disposed on the insulation substrate, wherein the repair pattern extends from the common voltage line.

The common voltage line and the repair pattern may be in a same layer with a layer of the data line.

The common voltage line may be disposed between two data lines neighboring each other and extends in a direction substantially parallel to the two data lines.

Two pixel electrodes may be disposed between the two data lines neighboring each other.

The repair pattern may be disposed at a part adjacent to an edge of the pixel electrode and adjacent to the gate line.

One of the pixel electrode and the common electrode may have a planar shape and the other one may include a plurality of branch electrodes, and the repair pattern may not overlap the plurality of branch electrodes.

The repair pattern may be disposed at a center part of the pixel electrode.

The repair pattern may overlap the common electrode.

The repair pattern may be in a same layer as that of the gate line.

According to the liquid crystal display according to an exemplary embodiment of the invention, it is possible to repair the bad pixel while effectively preventing aperture ratio deterioration of the liquid crystal display and effectively reduce the number of data lines while effectively reducing a signal delay of the common voltage line, so as to effectively reduce costs of a driver of the liquid crystal display.

BRIEF DESCRIPTION OF THE DRAWINGS

The above and other aspects, advantages and features of the disclosure will become more apparent by describing in further detail exemplary embodiments thereof with reference to the accompanying drawings, in which.

DETAILED DESCRIPTION

Figure 1:
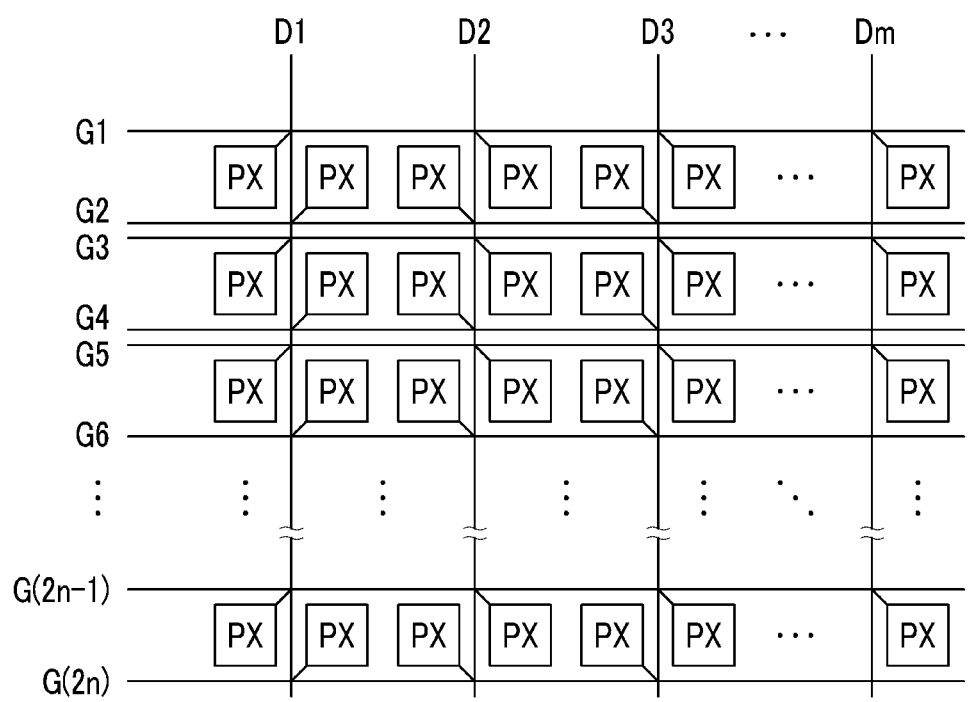
FIG. 1 illustrates an exemplary embodiment of a pixel arrangement of a liquid crystal display according to the invention.

A bad pixel among a plurality of pixels of a liquid crystal display may have a problem such as an electrical short circuit of a signal line on the pixel. A repair method of applying a common voltage to a pixel electrode to display the pixel electrode as black for the bad pixel is provided. In such a repair process, when two transparent electric field generating electrodes are connected to each other without disposing any repair pattern therebetween, the electric field generating electrodes may be disconnected. Further, when a repair pattern for connecting the electric field generating electrodes is disposed between the electric field generating electrodes to prevent the disconnection of the electric field generating electrodes, an aperture ratio of the liquid crystal display is reduced.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, layouts of signal lines and pixels of a liquid crystal display according to an exemplary embodiment of the invention will be described with reference to FIG. 1. FIG. 1 illustrates layouts of signal lines and pixels of a liquid crystal display according to an exemplary embodiment of the invention.

Referring to FIG. 1, the liquid crystal display according to the exemplary embodiment of the invention includes a plurality of display signal lines G1 to G($2n$) and D1 to Dm and a plurality of pixels PX connected with the display signal lines and arranged substantially in a form of a matrix.

The display signal lines G1 to G($2n$) and D1 to Dm include a plurality of gate lines G1 to G($2n$) transmitting gate signals (also referred to as "scanning signals") and the data lines D1 to Dm (also referred to as "data signal lines") transmitting data signals. The gate lines G1 to G($2n$) substantially parallel to each other extend substantially in a row direction, and the data lines D1 to Dm substantially parallel to each other extend substantially in a column direction.

A pair of gate lines G($2i-1$) and G($2i$) ($i=1, 2 \ldots n$) is respectively disposed above and below the pixels PX of one row and connected to the pixel, and each of the data lines Dj ($j=1, 2 \ldots m$) is disposed between the pixels PX of two columns and connected to the left and right pixels PX. More specifically, the pixels PX of one row are connected to the adjacent data lines D1 to Dm and alternately connected to a pair of the adjacent gate lines G($2i-1$) and G($2i$). The pixels PX of one column are connected to the adjacent data lines Dj and the same gate lines of the two adjacent gate lines G($2i-1$) to G($2i$). In an exemplary embodiment, among the pixels PX of one column connected to one of the data lines D1 to Dm, pixels PX disposed at a left side of the data line are connected to the upper gate lines (e.g., G1, G3, G5, . . . ), and pixels PX disposed at the right side are connected to the lower gate lines (e.g., G2, G4, G6, . . . ), for example. In other words, in each pixel row, ($2k-1$)-th pixels ($k=1, 2 \ldots m$) are connected to the ($2i-1$)-th gate line G($2i-1$) and the k-th data line Dk, and 2k-th pixels ($k=1$, 2 . . . m) are connected to the 2i-th gate line G(2i) and the k-th data line Dk. Unlike the illustrated exemplary embodiment, in each pixel row, (2k−1)-th pixels (k=1, 2 . . . m) may be connected to the 2i-th gate line G(2i) and the k-th data line Dk, and 2k-th pixels may be connected to the (2i−1)-th gate line G(2i−1) and the k-th data line Dk.

Through the above illustrated layout, number of data lines can be effectively reduced to half the number of the pixel columns and costs of the data driver can be effectively reduced, and accordingly, manufacturing costs of the liquid crystal display can be effectively reduced.

Figure 2:
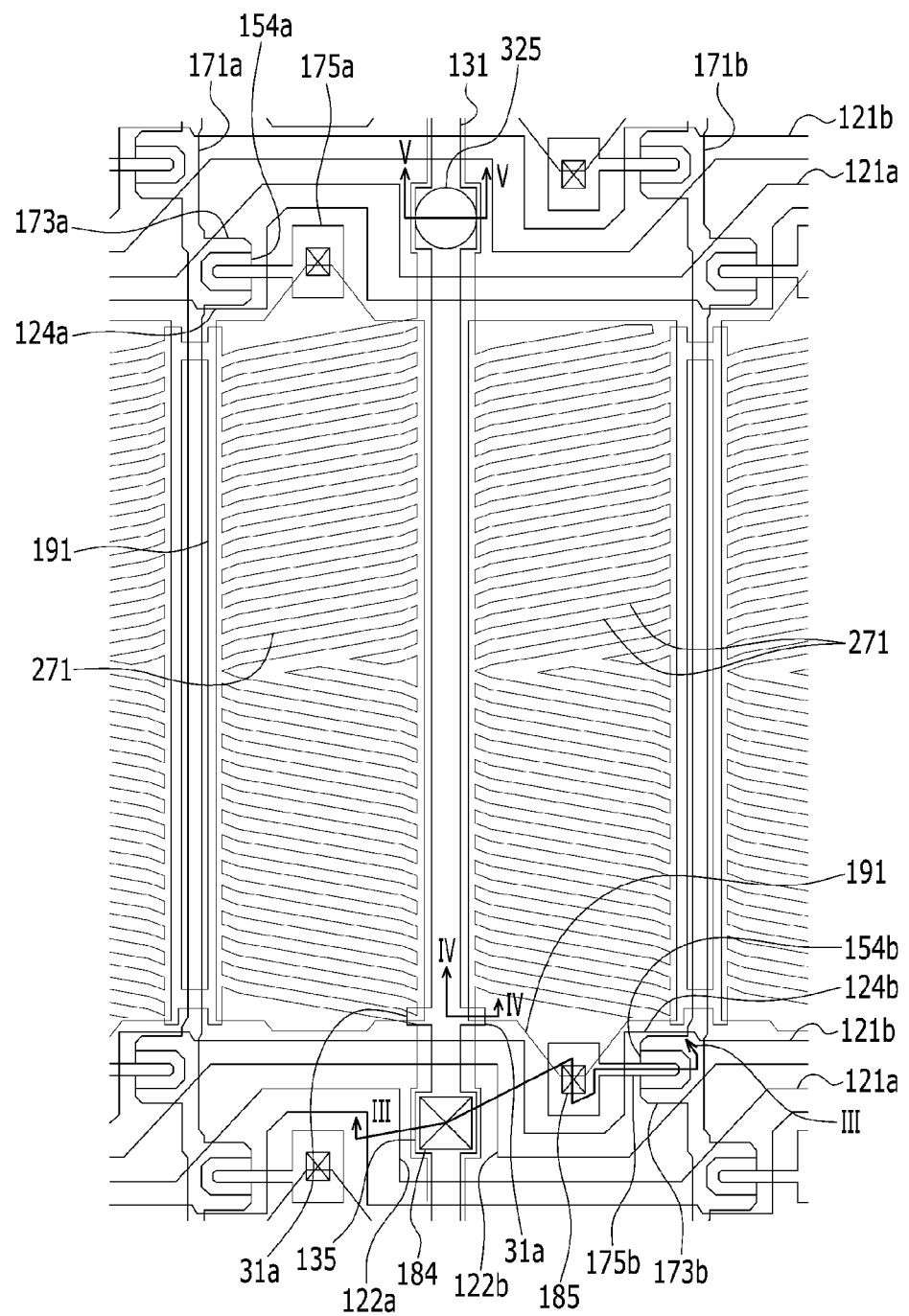
FIG. 2 is a plan view of an exemplary embodiment of a liquid crystal display according to the invention.
Figure 3:
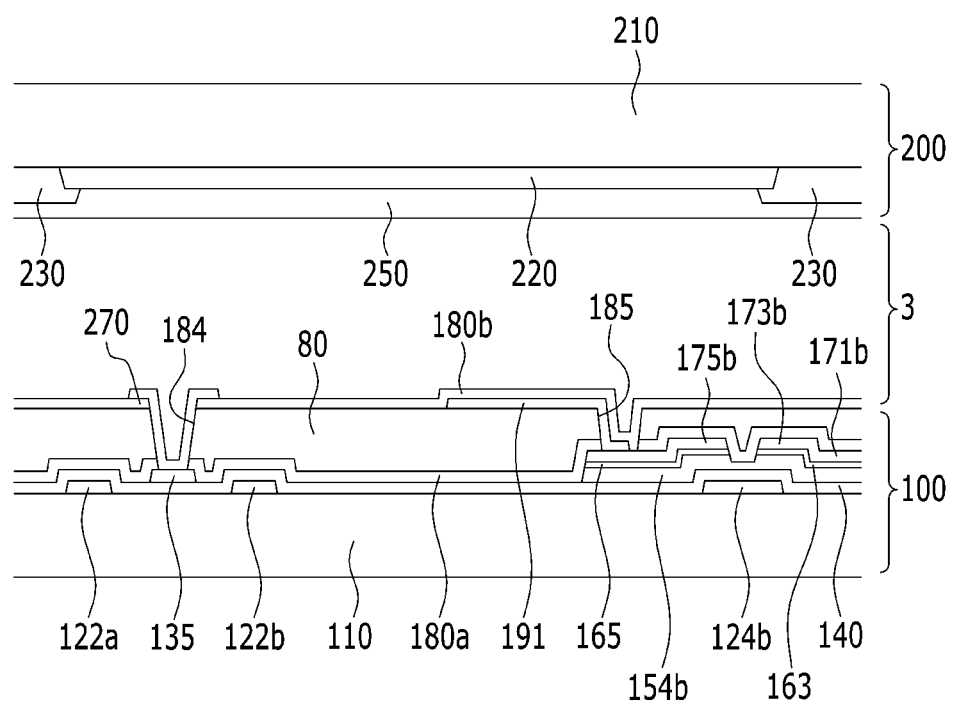
FIG. 3 is a cross-sectional view of the liquid crystal display taken along line III-III of FIG. 2.
Figure 4:
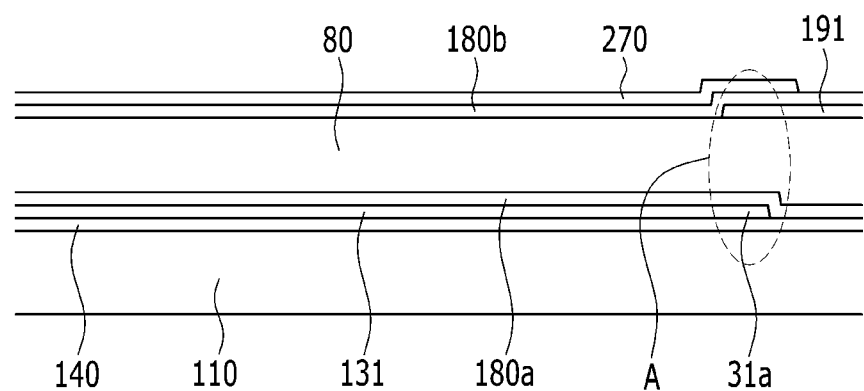
FIG. 4 is a cross-sectional view of the liquid crystal display taken along line IV-IV of FIG. 2.
Figure 5:
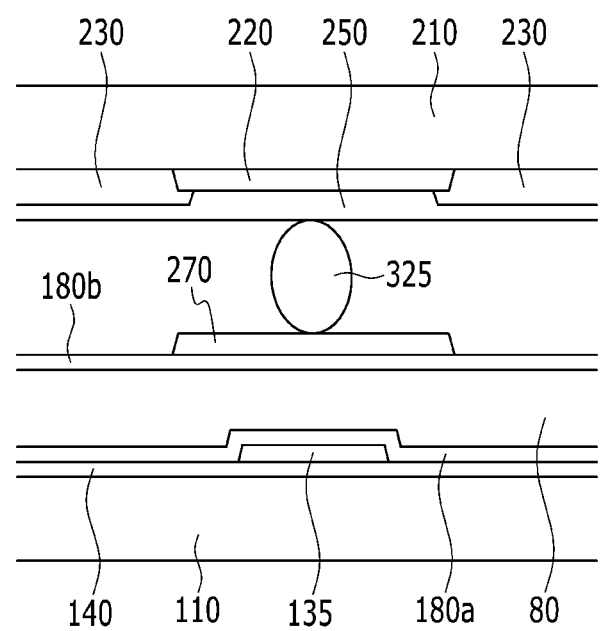
FIG. 5 is a cross-sectional view of the liquid crystal display taken along line V-V of FIG. 2.

Then, a liquid crystal display according to an exemplary embodiment of the invention will be described with reference to FIGS. 2 to 5. FIG. 2 is a plan view of a liquid crystal display according to an exemplary embodiment of the invention, FIG. 3 is a cross-sectional view of the liquid crystal display taken along line III-III of FIG. 2, FIG. 4 is a cross-sectional view of the liquid crystal display taken along line IV-IV of FIG. 2, and FIG. 5 is a cross-sectional view of the liquid crystal display taken along line V-V of FIG. 2.

Referring to FIGS. 2 to 5, the liquid crystal display according to the exemplary embodiment of the invention includes a lower display panel 100 and an upper display panel 200 facing each other, and a liquid crystal layer 3 injected between the two display panels 100 and 200.

The lower display panel 100 will be described below.

A plurality of gate lines 121a and 121b is disposed on a first insulation substrate 110. The gate lines 121a and 121b are disposed for each pixel row, and include the first gate line 121a disposed at an upper side along the pixel row and the second gate line 121b disposed at a lower side along the pixel row. The first gate line 121a is disposed close to the second gate line 121b disposed on an adjacent previous pixel row, and the second gate line 121b is disposed close to the first gate line 121a disposed on an adjacent next pixel row. Accordingly, the first gate line 121a and the second gate line 121b which are disposed on the present pixel row are paired with the second gate line 121b and the first gate line 121a which are disposed on an adjacent pixel row and disposed between pixel rows.

The first gate line 121a includes a first gate electrode 124a, and the second gate line 121b includes a second gate electrode 124b. The first gate line 121a includes a first vertical part 122a, and the second gate line 121b includes a second vertical part 122b.

A gate insulating layer 140 is disposed on the gate lines 121a and 121b.

A first semiconductor 154a and a second semiconductor 154b are disposed on the gate insulating layer 140. A plurality of ohmic contacts 163 and 165 is disposed on semiconductors 154a and 154b.

A data conductor including a plurality of data lines 171a and 171b, a plurality of drain electrodes 175a and 175b, a plurality of common voltage lines 131 and a plurality of first repair patterns 31a includes the ohmic contacts 163 and 165.

The data lines 171a and 171b transmit data signals and substantially extend in a vertical direction to cross the gate lines 121a and 121b. The data lines 171a and 171b include the first data line 171a and the second data line 171b disposed with two pixel electrodes 191 therebetween.

Each of the data lines 171a and 171b is disposed for each of the two pixel columns, and the data lines 171a and 171b are alternately connected with the pixel electrode 191 of the pixel disposed at a left side and a right side of the data lines 171a and 171b along the pixel column. As described above, each of the data lines 171a and 171b is connected with the two pixel electrodes 191 disposed on two pixel columns along the pixel column to apply the data voltage, thereby effectively reducing the number of data lines 171a and 171b in half. Accordingly, it is possible to effectively reduce costs of the liquid crystal display.

The first data line 171a includes a first source electrode 173a extending toward the first gate electrode 124a, and the second data line 171b includes a second source electrode 173b extending toward the second gate electrode 124b.

The first drain electrode 175a includes an end part facing the first source electrode 173a based on the first gate electrode 124a, and the other end part having a large area.

The second drain electrode 175b includes an end part facing the second source electrode 173b based on the second gate electrode 124b, and the other end part having a large area.

The common voltage line 131 is disposed between the two data lines 171a and 171b and extends in substantially parallel to the data lines 171a and 171b. The common voltage line 131 includes a plurality of extension portions 135. The extension portion 135 of the common voltage line 131 is disposed between the vertical parts 122a and 122b of the first gate line 121a and the second gate line 121b.

As described above, an area provided by the gate lines 121a and 121b and the extension portion 135 of the common voltage line 131 can be effectively reduced by arranging the extension portion 135 of the common voltage line 131 between the vertical parts 122a and 122b of the first gate line 121a and the second gate line 121b.

A portion of the plurality of extension portions 135 of the common voltage lines 131 overlaps a contact hole 184 described below and a portion of the plurality of extension portions 135 overlaps a spacer 325 described below.

The plurality of first repair patterns 31a protrudes from the common voltage line 131. The plurality of first repair patterns 31a overlaps the pixel electrode 191 and a common electrode 270 described below.

The plurality of first repair patterns 31a is disposed close to the second gate line 121b, and thus disposed at a peripheral edge part of a pixel area.

A first passivation layer 180a is disposed on the data conductors including the data lines 171a and 171b, the drain electrodes 175a and 175b and the common voltage lines 131, an exposed portion of the semiconductors 154a and 154b and the pixel electrode 191. The first passivation layer 180a may include an organic insulating material or an inorganic insulating material.

An organic layer 80 is disposed on the first passivation layer 180a. The organic layer 80 is thicker than the first passivation layer 180a, and may have a flat surface.

The organic layer 80 may be omitted in a liquid crystal display according to another exemplary embodiment of the invention. The organic layer 80 may be a color filter in a liquid crystal display according to another exemplary embodiment of the invention. In this case, the liquid crystal display may further include a layer disposed on the organic layer 80. In an exemplary embodiment, the liquid crystal display may further include a capping layer that is disposed on the color filter to effectively prevent a pigment of the color filter from being injected into a liquid crystal layer, and the capping layer may include an insulating material such as silicon nitride (SiNx), for example.

A first contact hole 184 exposing an extension portion 135 of the common voltage line 131 and a second contact hole 185 exposing a part of the drain electrodes 175a and 175b are defined on the first passivation layer 180a and the organic layer 80.

In the liquid crystal display according to the illustrated exemplary embodiment, the first contact hole 184 exposing the common voltage line 131 does not overlap the gate lines 121a and 121b. The extension portion 135 of the common voltage line 131 exposed by the first contact hole 184 also may not overlap the gate lines 121a and 121b.

As described above, by defining the first contact hole 184 exposing the common voltage line 131 to be separated from the gate lines 121a and 121b, a short circuit between the gate lines 121a and 121b and the common voltage line 131 due to penetration of static electricity generated during a process of defining the first contact hole 184 into the gate insulating layer 140 can be effectively prevented.

Further, by providing the extension portion 135 of the common voltage line 131 not to overlap the gate lines 121a and 121b, a step may not be provided on the extension portion 135 of the common voltage line 131, and thus the first contact hole 184 may be symmetrically provided without a height difference according to a position. Accordingly, it is possible to enhance reliability of a physical and electrical connection between the common voltage line 131 and the common electrode 270 connected to each other through the first contact hole 184.

The pixel electrode 191 is disposed on the first passivation layer 180a. The pixel electrode 191 may have a planar shape which occupies most of one pixel area. A total shape of the pixel electrode 191 may be a polygon having sides substantially parallel to the gate lines 121a and 121b, the data line 171a or 171b, and the common voltage line 131. The pixel electrode 191 may include a transparent conductive material such as indium tin oxide ("ITO") or indium zinc oxide ("IZO").

The pixel electrode 191 is physically and electrically connected with the drain electrode 175 through the second contact hole 185 to receive a data voltage.

A second passivation layer 180b is disposed on the pixel electrode 191. The second passivation layer 180b may include an organic insulating material or an inorganic insulating material.

The common electrode 270 is disposed on the second passivation layer 180b. The common electrode 270 includes a plurality of first branch electrodes 271 and the branch electrodes is connected with the common electrode 270 disposed on a neighboring pixel.

The common electrode 270 is physically and electrically connected with the common voltage line 131 through the first contact hole 184 disposed on the first passivation layer 180a and receives a common voltage from the common voltage line 131.

The pixel electrode 191 having received the data voltage generates an electric field in the liquid crystal layer 3 together with the common electrode 270 having received the common voltage.

The plurality of first branch electrodes 271 of the common electrode 270 overlaps the pixel electrode 191 having a planar shape.

Then, the upper display panel 200 will be described. A light blocking member 220 is disposed on a second insulation substrate 210. A plurality of color filters 230 is also disposed on the second insulation substrate 210. Most of the color filters 230 may exist within an area surrounded by the light blocking member 220.

In a liquid crystal display according to another exemplary embodiment of the invention, the organic layer 80 disposed on the lower display panel 100 may be the color filter, and the color filter 230 may not be disposed on the upper display panel 200. In this case, the light blocking member 220 also may be disposed on the lower display panel 100, not on the upper display panel 200.

An overcoat 250 is disposed on the color filter 230 and the light blocking member 220. The overcoat 250 may include an (organic) insulating material, and effectively prevents the color filter 230 from being exposed and provides a flat surface. The overcoat 250 may be omitted.

A spacer 325 is disposed between the lower display panel 100 and the upper display panel 200. The spacer 325 is disposed at a position overlapping a part of the plurality of extension portions 135 of the common voltage line 131.

The first contact hole 184 for the electrical connection between the common voltage line 131 and the common electrode 270 is not disposed on a portion of the plurality of extension portions 135 of the common voltage line 131 which overlap the spacer 325.

As described above, by not defining a common contact hole for the electrical connection between the common voltage line 131 and the common electrode 270 at a position where the spacer 325 is disposed, a step of a lower part of the spacer 325 is effectively reduced, thereby assisting in a stable disposition of the spacer 325. Further, by providing the spacer 325 not to overlap the gate lines 121a and 121b, the step of a lower layer of the spacer 325 is effectively reduced, thereby assisting in the stable disposition of the spacer 325.

In the liquid crystal display according to the illustrated exemplary embodiment, a portion of the plurality of extension portions 135 of the common voltage line 131 of the liquid crystal display overlaps the first contact hole 184 for the electrical connection between the common voltage line 131 and the common electrode 270, and a portion of the extension portions 135 overlap the spacer 325. Further, by not defining the common contact hole for the electrical connection between the common voltage line 131 and the common electrode 270 at the position where the spacer 325 is disposed, the step of the lower part of the spacer 325 is effectively reduced, thereby assisting in the stable disposition of the spacer 325. In addition, by providing the spacer 325 not to overlap the gate lines 121a and 121b, the step of the lower layer of the spacer 325 is effectively reduced, thereby assisting in the stable disposition of the spacer 325.

In the liquid crystal display according to the illustrated exemplary embodiment, by disposing the spacer 325 for maintaining an interval between the lower display panel 100 and the upper display panel 200 at a position overlapping a portion of the plurality of extension portions 135 of the common voltage line 131, it is not required to effectively prevent a light leakage of an area where the spacer 325 is disposed by using a separate light blocking member, thereby effectively preventing deterioration of an aperture ratio of the liquid crystal display.

The liquid crystal layer 3 between the lower display panel 100 and the upper display panel 200 includes a liquid crystal molecule (not shown), and the liquid crystal molecule may be oriented such that a long axis thereof is substantially parallel to surfaces of the two display panels 100 and 200 in a state where there is no electric field.

The first repair patterns 31a of the liquid crystal display according to an exemplary embodiment of the invention will be described in more detail with reference to FIG. 4.

The plurality of first repair patterns 31a protrudes from the common voltage line 131. The plurality of first repair patterns 31a overlaps the pixel electrode 191 and the common electrode 270 in a first area A.

When bad pixels among a plurality of pixels, are generated during a process of manufacturing the liquid crystal display and thus a desired image display is not possible, the common voltage is applied to the pixel electrode 191 to display the bad pixel as black so that the bad pixels are not easily viewed.

For the repair of the bad pixels, by applying the common voltage to the pixel electrode 191, the pixel electrode 191 and the common electrode 270 which overlap each other with the second passivation layer 180b therebetween are required to be short circuited.

For the short circuit, the second passivation layer 180b disposed between the pixel electrode 191 and the common electrode 270 is removed by using a laser, and the common electrode 270 disposed at a relatively upper part is connected with the pixel electrode 191 disposed at a relatively lower part by melting the common electrode 270. However, when the pixel electrode 191 and the common electrode 270 overlap each other with the second passivation layer 180b therebetween, the pixel electrode 191 and the common electrode 270 respectively include a relatively thin transparent conductor. Accordingly, when the second passivation layer 180b disposed between the pixel electrode 191 and the common electrode 270 is removed, the pixel electrode 191 and the common electrode 270 may be removed together with the second passivation layer 180b.

The liquid crystal display according to an exemplary embodiment of the invention includes the plurality of first repair patterns 31a expanding from the common voltage line 131. Since the plurality of first repair patterns 31a includes a metal which is relatively thicker than a transparent conductor and resists heat, the first repair patterns 31a are left without being removed when the pixel electrode 191 and the common electrode 270 are short circuited by using a laser. Accordingly, the repair by applying the common voltage to the pixel electrode 191 of the bad pixel may be made by applying a laser to the first area A where the plurality of first repair patterns 31a is disposed and the pixel electrode 191 and the common electrode 270 overlap each other and causing the short circuit between the common electrode 270 and the pixel electrode 191, and the first repair patterns 31a.

Further, as described above, the plurality of first repair patterns 31a is disposed close to the second gate line 121b, and thus disposed in a peripheral edge part of the pixel area having relative low brightness. Accordingly, transmittance deterioration of the liquid crystal display may be effectively reduced in comparison with a case where the plurality of first repair patterns 31a is disposed on a center part of the pixel area having relatively high brightness.

It is preferable that the plurality of first repair patterns 31a has minimum sizes which can be repaired using laser, and a horizontal size and a vertical size of the plurality of first repair patterns 31a in a plan view may be, for example, about 3 micrometers (μm).

As described above, the liquid crystal display according to an exemplary embodiment of the invention may include the plurality of first repair patterns 31a expanding from the common voltage line 131 to repair the generated bad pixels by making the short circuit between the pixel electrode 191 and the common electrode 270, which overlap each other with the second passivation layer 180b therebetween and include a relatively thin transparent conductor, and the first repair patterns 31a. Further, transmittance deterioration of the liquid crystal display due to the first repair patterns 31a can be effectively prevented by defining the first repair patterns 31a at a peripheral edge area of the pixel area having relative low brightness.

In addition, the liquid crystal display according to an exemplary embodiment of the invention may include the common voltage line 131 to effectively reduce a signal delay of the common voltage applied to the common electrode 270 and effectively reduce the number of data lines, thereby effectively reduce costs of a driver of the liquid crystal display.

The first repair patterns 31a of the liquid crystal display according to the illustrated exemplary embodiment overlap the pixel electrode 191 and the common electrode 270, but the first repair patterns 31a may overlap the pixel electrode 191 and may not overlap the common electrode 270 in a liquid crystal display according to another exemplary embodiment of the invention. At this time, the first repair patterns 31a extend from the common voltage line 131 to receive the common voltage. Accordingly, when the bad pixel is generated, the repair can be made such that the pixel electrode 191 receives the common voltage through the short circuit between the pixel electrode 191 and the first repair patterns 31a.

Figure 6:
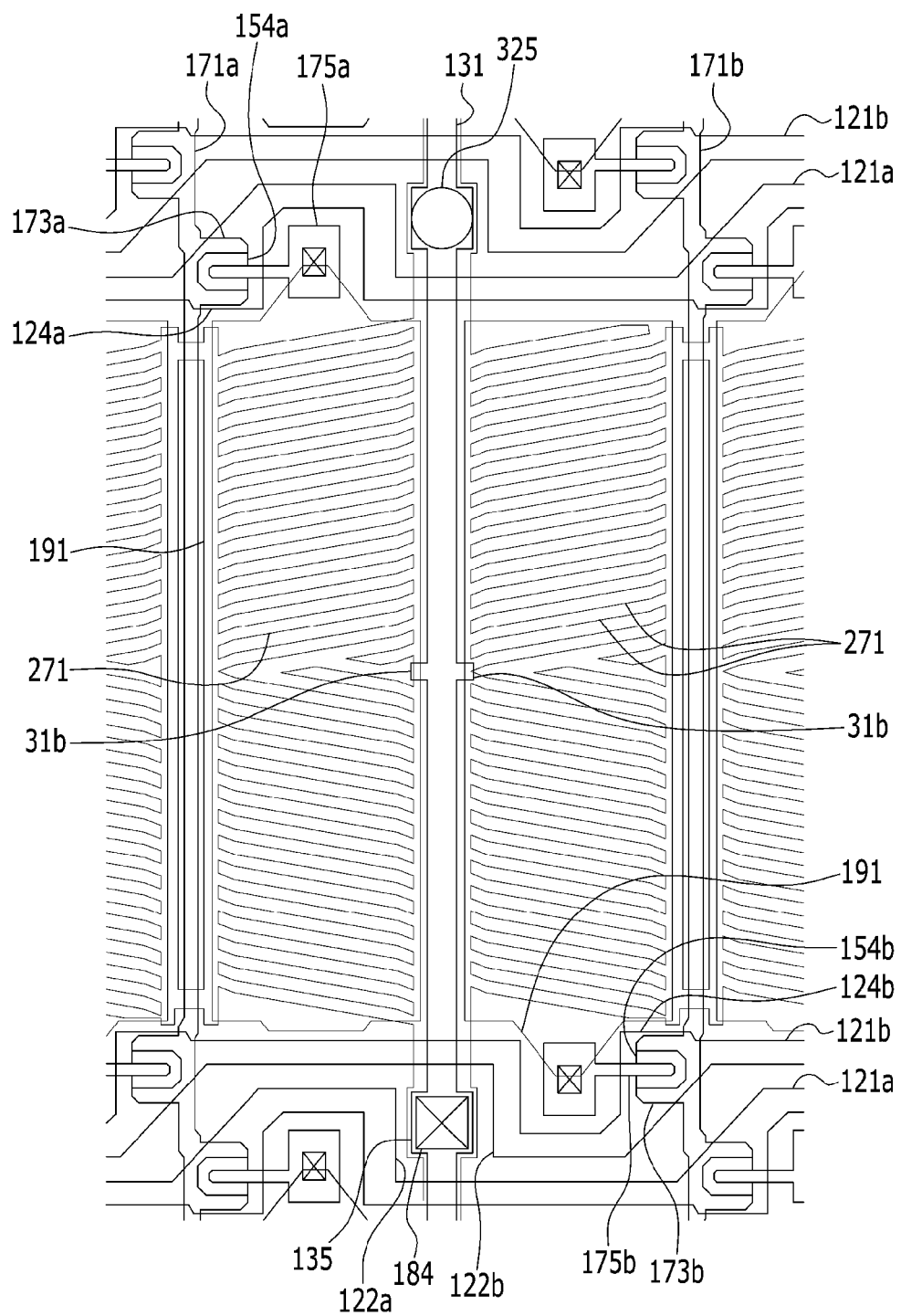
FIG. 6 is a plan view of another exemplary embodiment of a liquid crystal display according to the invention.

Then, a liquid crystal display according to another exemplary embodiment of the invention will be described with reference to FIG. 6. FIG. 6 is a plan view of a liquid crystal display according to another exemplary embodiment of the invention.

Referring to FIG. 6, the liquid crystal display according to the illustrated exemplary embodiment is substantially similar to the liquid crystal display according to the exemplary embodiment described with reference to FIGS. 2 to 5. Detailed descriptions of the same components will be omitted.

The liquid crystal display according to the illustrated exemplary embodiment includes a plurality of second repair patterns 31b disposed at a center part of the pixel area unlike the liquid crystal display according to the exemplary embodiment described with reference to FIGS. 2 to 5. The plurality of second repair patterns 31b may extend from the common voltage line 131.

The plurality of second repair patterns 31b overlaps the pixel electrode 191 and the common electrode 270.

The plurality of second repair patterns 31b of the liquid crystal display according to the illustrated exemplary embodiment overlaps the pixel electrode 191 and the common electrode 270, the plurality of second repair patterns 31b may overlap the pixel electrode 191 and may not overlap the common electrode 270 in a liquid crystal display according to another exemplary embodiment of the invention. At this time, the second repair patterns 31b extend from the common voltage line 131 to receive the common voltage. Accordingly, when the bad pixel is generated, the repair can be made such that the pixel electrode 191 receives the common voltage through the short circuit between the pixel electrode 191 and the second repair patterns 31b.

The plurality of second repair patterns 31b is disposed at the center part of the pixel area, but disposed at an area which does not overlap the plurality of first branch electrodes 271 of the common electrode 270. A part of the pixel area where the plurality of first branch electrodes 271 of the common electrode 270 is disposed is a relatively bright part. Accordingly, since the plurality of second repair patterns 31b is disposed at a relatively dark area, transmittance deterioration of the liquid crystal display due to the second repair patterns 31b can be effectively prevented.

Many characteristics of the liquid crystal display according to the exemplary embodiment described with reference to FIGS. 1 and 2 to 5 are all applicable to the liquid crystal display according to the illustrated exemplary embodiment described with reference to FIG. 6.

Figure 7:
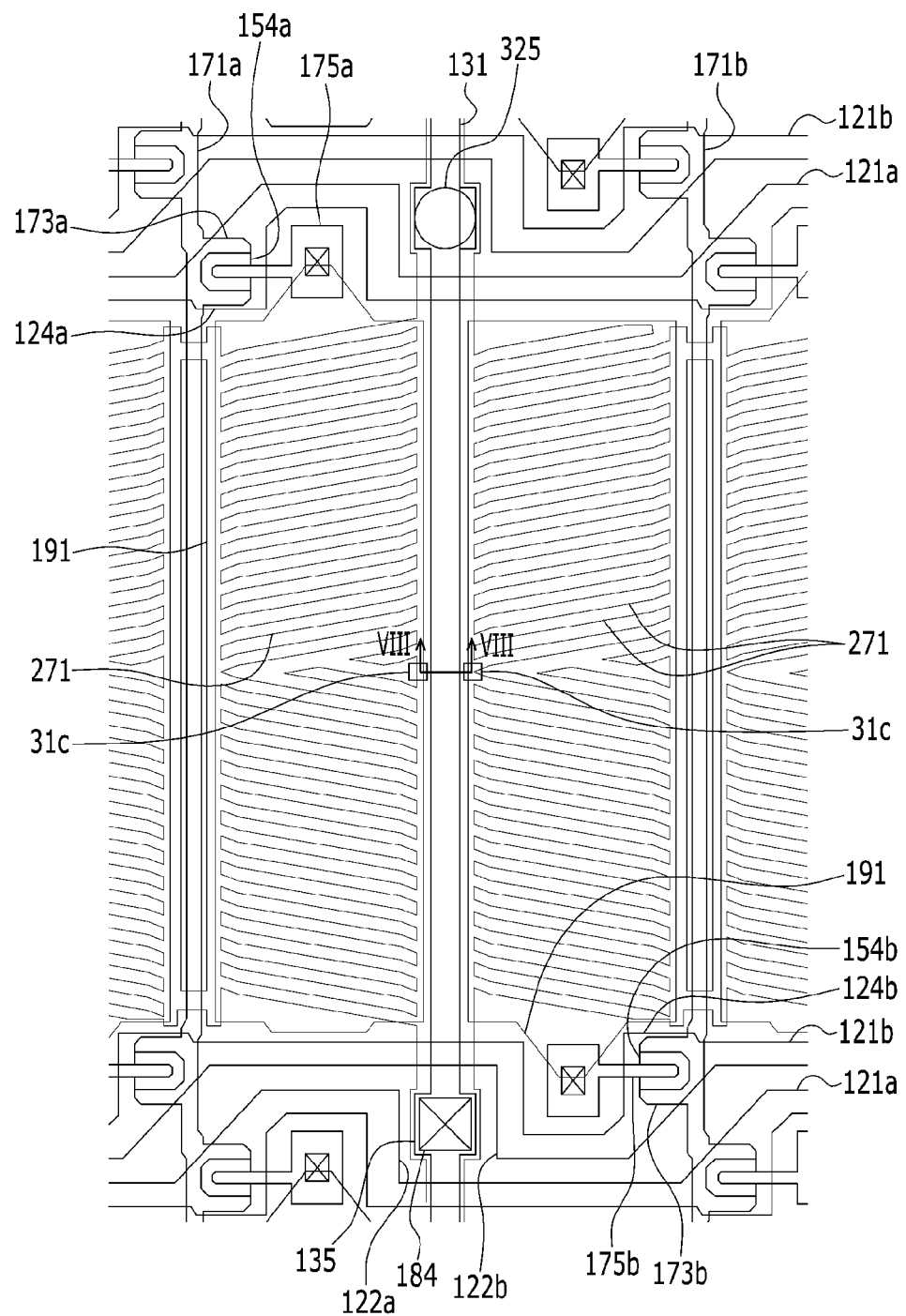
FIG. 7 is a plan view of a liquid crystal display according to another exemplary embodiment of the invention.
Figure 8:
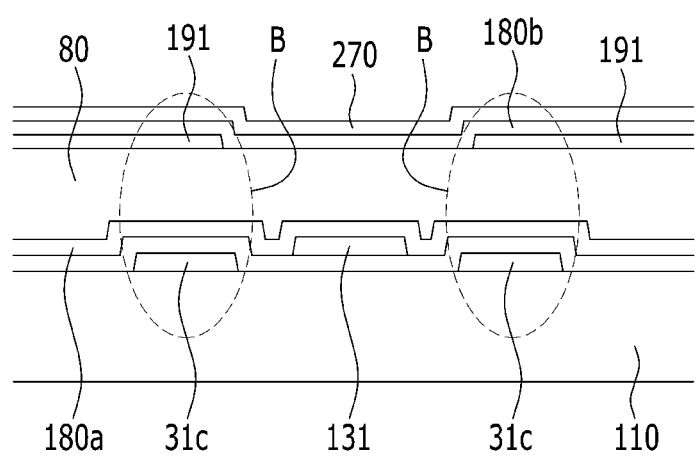
FIG. 8 is a cross-sectional view of the liquid crystal display taken along line VIII-VIII of FIG. 7.

Then, a liquid crystal display according to another exemplary embodiment of the invention will be described with reference to FIGS. 7 and 8. FIG. 7 is a plan view of a liquid crystal display according to another exemplary embodiment of the invention, and FIG. 8 is a cross-sectional view of the liquid crystal display of FIG. 7 taken along line VIII-VIII.

The liquid crystal display according to the illustrated exemplary embodiment is substantially similar to the liquid crystal display according to the exemplary embodiment described with reference to FIGS. 2 to 5. Detailed descriptions of the same components will be omitted.

Unlike the liquid crystal display according to the exemplary embodiment described with reference to FIGS. 2 to 5, the liquid crystal display according to the illustrated exemplary embodiment includes a plurality of third repair patterns 31c which is separated from the common voltage line 131 and in a same layer as that of the gate lines 121a and 121b.

The third repair patterns 31c of the liquid crystal display according to the illustrated exemplary embodiment are in the same layer as that of the gate lines 121a and 121b, but the third repair patterns 31c may be in a same layer as that of the data line 171 in a liquid crystal display according to another exemplary embodiment of the invention.

The plurality of third repair patterns 31c overlaps the pixel electrode 191 and the common electrode 270 in a second area B.

The plurality of third repair patterns 31c is disposed at a center part of the pixel area, but disposed at an area which does not overlap the plurality of first branch electrodes 271 of the common electrode 270. A part of the pixel area where the plurality of first branch electrodes 271 of the common electrode 270 is disposed is a relatively bright part. Accordingly, since the plurality of third repair patterns 31c is disposed at a relatively dark area, transmittance deterioration of the liquid crystal display due to the third repair patterns 31c can be effectively prevented.

The plurality of third repair patterns 31c of the liquid crystal display according to the illustrated exemplary embodiment is disposed at the center part of the pixel area, but the third repair patterns 31c may be disposed at a peripheral edge part of the pixel area having relatively low brightness in a liquid crystal display according to another exemplary embodiment of the invention.

Many characteristics of the liquid crystal display according to the exemplary embodiment described with reference to FIGS. 1 and 2 to 5 are all applicable to the liquid crystal display according to the illustrated exemplary embodiment described with reference to FIGS. 7 and 8.

Figure 9:
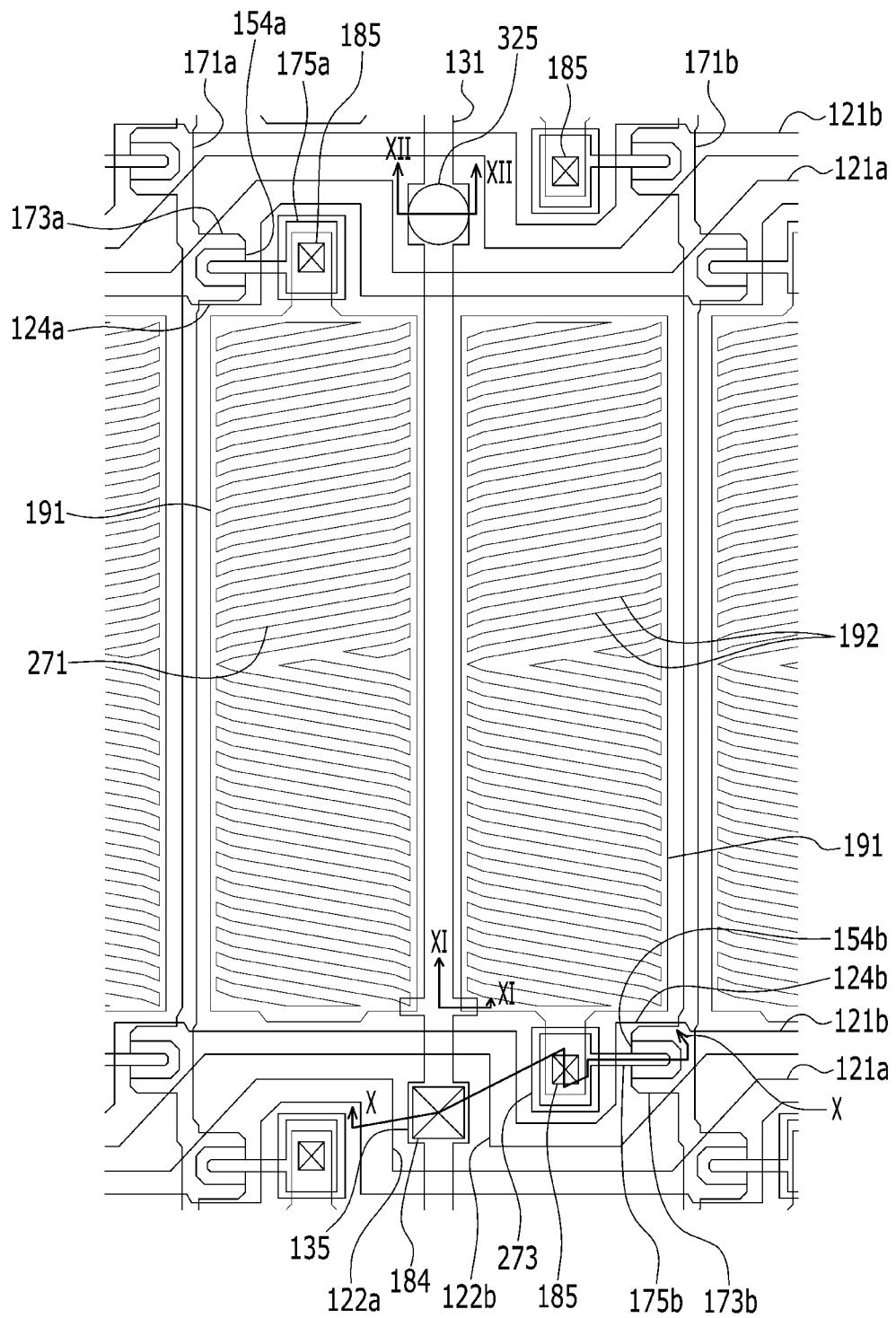
FIG. 9 is a plan view of another exemplary embodiment of a liquid crystal display according to the invention.
Figure 10:
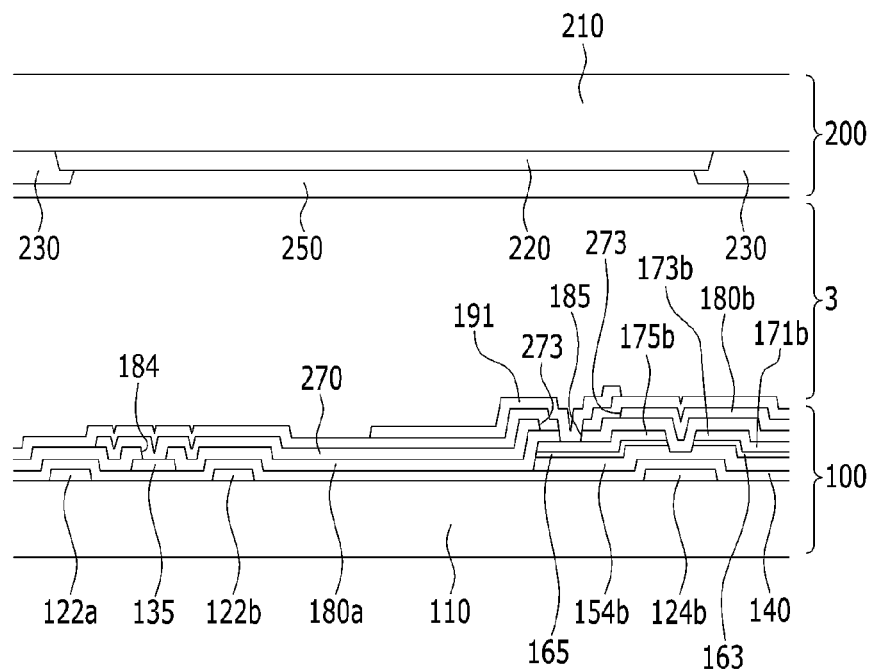
FIG. 10 is a cross-sectional view of the liquid crystal display taken along line X-X of FIG. 9.
Figure 11:
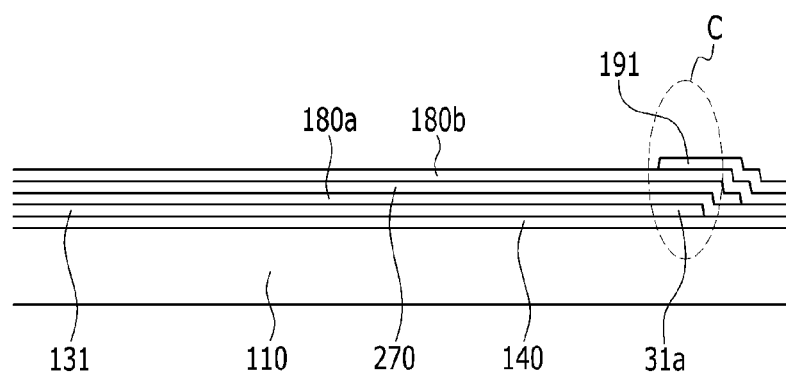
FIG. 11 is a cross-sectional view of the liquid crystal display taken along line XI-XI of FIG. 9.
Figure 12:
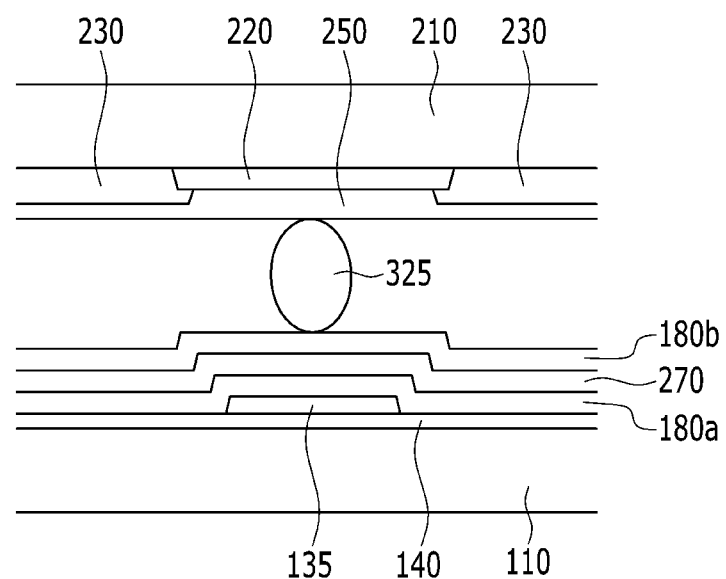
FIG. 12 is a cross-sectional view of the liquid crystal display taken along line XII-XII of FIG. 9.

Then, a liquid crystal display according to another exemplary embodiment of the invention will be described with reference to FIGS. 9 to 12. FIG. 9 is a plan view of a liquid crystal display according to another exemplary embodiment of the invention, FIG. 10 is a cross-sectional view of the liquid crystal display of FIG. 9 taken along line X-X, FIG. 11 is a cross-sectional view of the liquid crystal display of FIG. 9 taken along line XI-XI, and FIG. 12 is a cross-sectional view of the liquid crystal display of FIG. 9 taken along line XII-XII.

Referring to FIGS. 9 to 12, the liquid crystal display according to the illustrated exemplary embodiment is similar to the liquid crystal display according to the exemplary embodiment described with reference to FIGS. 2 to 5.

The liquid crystal display according to an exemplary embodiment of the invention includes the lower display panel 100 and the upper display panel 200 which face each other, and the liquid crystal layer 3 injected between the two display panels 100 and 200.

The lower display panel 100 will be described.

The plurality of gate lines 121a and 121b is disposed on the first insulation substrate 110. The gate lines 121a and 121b are disposed on every one pixel row, and include the first gate line 121a disposed on an upper part along the pixel row and the second gate line 121b disposed on a lower part along the pixel row. The first gate line 121a is disposed close to the second gate line 121b disposed on an adjacent previous pixel row, and the second gate line 121b is disposed close to the first gate line 121a disposed on an adjacent next pixel row. Accordingly, the first gate line 121a and the second gate line 121b which are disposed on the present pixel row are paired with the second gate line 121b and the first gate line 121a which are disposed on an adjacent pixel row and disposed between pixel rows.

The first gate line 121a includes the first gate electrode 124a, and the second gate line 121b includes the second gate electrode 124b. The first gate line 121a includes the first vertical part 122a, and the second gate line 121b includes the second vertical part 122b.

The gate insulating layer 140 is disposed on the gate lines 121a and 121b.

The first semiconductor 154a and the second semiconductor 154b are disposed on the gate insulating layer 140. A plurality of ohmic contacts 163 and 165 is disposed on the semiconductors 154a and 154b.

A data conductor including the plurality of data lines 171a and 171b, the plurality of drain electrodes 175a and 175b, the plurality of common voltage lines 131 and the plurality of first repair patterns 31a and 31b includes the ohmic contacts 163 and 165.

The data lines 171a and 171b transmit data signals and extend in a substantially vertical direction to cross the gate lines 121a and 121b. The data lines 171a and 171b include the first data line 171a and the second data line 171b disposed with two pixel electrodes 191 therebetween.

Each of the data lines 171a and 171b is disposed for each of the two pixel columns, and the data lines 171a and 171b are alternately connected with the pixel electrode 191 of the pixel disposed at a left side and a right side of the data lines 171a and 171b along the pixel column. As described above, each of the data lines 171a and 171b is connected with the two pixel electrodes 191 disposed on two pixel columns along the pixel column to apply the data voltage, thereby effectively reducing the number of data lines 171a and 171b in half. Accordingly, it is possible to effectively reduce costs of the liquid crystal display.

The first data line 171a include the first source electrode 173a extending toward the first gate electrode 124a, and the second data line 171b includes the second source electrode 173b extending toward the second gate electrode 124b.

The first drain electrode 175a includes an end part facing the first source electrode 173a based on the first gate electrode 124a and the other end part having a large area.

The second drain electrode 175b includes an end part facing the second source electrode 173b based on the second gate electrode 124b, and the other end part having a large area.

The common voltage line 131 is disposed between the two data lines 171a and 171b and extends in substantially parallel to the data lines 171a and 171b. The common voltage line 131 includes the plurality of extension portions 135. The extension portion 135 of the common voltage line 131 is disposed between the vertical parts 122a and 122b of the first gate line 121a and the second gate line 121b.

As described above, by disposing the extension portion 135 of the common voltage line 131 between the vertical parts 122a and 122b of the first gate line 121a and the second gate line 121b, an area provided by the gate lines 121a and 121b and the extension portion 135 of the common voltage line 131 can be effectively reduced.

A portion of the plurality of extension portions 135 of the common voltage lines 131 overlaps the first contact hole 184 and a portion of the plurality of extension portions 135 overlaps the spacer 325.

The plurality of first repair patterns 31a protrudes from the common voltage line 131. The plurality of first repair patterns 31a overlaps the pixel electrode 191 and the common electrode 270.

The plurality of first repair patterns 31a is disposed close to the second gate line 121b, and thus disposed at a peripheral edge part of the pixel area.

The first passivation layer 180a is disposed on the data conductor including the data lines 171a and 171b, the drain electrodes 175a and 175b and the common voltage lines 131, an exposed portion of the semiconductors 154a and 154b and the pixel electrode 191. The first passivation layer 180a may include an organic insulating material or an inorganic insulating material.

The first contact hole 184 exposing the extension portion 135 of the common voltage line 131 is disposed on the first passivation layer 180a The first contact hole 184 exposing the common voltage line 131 does not overlap the gate lines 121a and 121b. Also, the extension portion 135 of the common voltage line 131 on which the first contact hole 184 is defined may not overlap the gate lines 121a and 121b.

As described above, by providing the first contact hole 184 exposing the common voltage line 131 to be separated from the gate lines 121a and 121b, the short circuit between the gate lines 121a and 121b and the common voltage line 131 due to penetration of static electricity generated during a process of defining the first contact hole 184 into the gate insulating layer 140 can be effectively prevented.

Further, by providing the extension portion 135 of the common voltage line 131 not to overlap the gate lines 121a and 121b, a step may not be provided on the extension portion 135 of the common voltage line 131, and thus the first contact hole 184 may be symmetrically provided without a height difference according to a position. Accordingly, it is possible to enhance reliability of a physical and electrical connection between the common voltage line 131 and the common electrode 270 connected to each other through the first contact hole 184.

The common electrode 270 is disposed on the first passivation layer 180a. The common electrode 270 is disposed at an entire pixel area and may have a substantially planar shape. The common electrode 270 has an opening 273 defined at a part overlapping the drain electrode 175.

The common electrode 270 is connected with the common voltage line 131 through the first contact hole 184 to receive the common voltage from the common voltage line 131.

The common electrode 270 may include a transparent conductive material such as ITO or IZO.

The second passivation layer 180b is disposed on the common electrode 270.

The second contact hole 185 exposing the drain electrode 175 is disposed on the second passivation layer 180b and the first passivation layer 180a.

The pixel electrode 191 is disposed on the second passivation layer 180b. The pixel electrode 191 includes a plurality of second branch electrodes 192.

The pixel electrode 191 may include a transparent conductive material such as ITO or IZO.

The pixel electrode 191 is physically and electrically connected with the drain electrode 175 through the second contact hole 185 to receive the data voltage.

The pixel electrode 191 having received the data voltage generates an electric field in the liquid crystal layer 3 together with the common electrode 270 having received the common voltage.

The plurality of second branch electrodes 192 of the pixel electrode 191 overlaps the common electrode 270 having a substantially planar shape.

Then, the upper display panel 200 will be described. The light blocking member 220 is disposed on the second insulation substrate 210. The plurality of color filters 230 is also disposed on the second insulation substrate 210. Most of the color filters 230 may exist within an area surrounded by the light blocking member 220.

In a liquid crystal display according to another exemplary embodiment of the invention, the color filter 230 may be disposed on the lower display panel 100 and may not be disposed on the upper display panel 200. In this case, the light blocking member 220 may also be disposed on the upper display panel 200, not on the lower display panel 100

The overcoat 250 is disposed on the color filter 230 and the light blocking member 220. The overcoat 250 may include an (organic) insulating material, and effectively prevents the color filter 230 from being exposed and provides a flat surface. The overcoat 250 may be omitted.

The spacer 325 is disposed between the lower display panel 100 and the upper display panel 200. The spacer 325 is disposed at a position overlapping a part of the plurality of extension portions 135 of the common voltage line 131.

The first contact hole 184 for the electrical connection between the common voltage line 131 and the common electrode 270 is not disposed on a portion of the plurality of extension portions 135 of the common voltage line 131 which overlaps the spacer 325.

As described above, by not defining a common contact hole for the electrical connection between the common voltage line 131 and the common electrode 270 at a position where the spacer 325 is disposed, a step of a lower part of the spacer 325 is effectively reduced, thereby assisting in a stable disposition of the spacer 325. Further, by providing the spacer 325 not to overlap the gate lines 121a and 121b, the step of a lower layer of the spacer 325 is effectively reduced, thereby assisting in the stable disposition of the spacer 325.

In the liquid crystal display according to the illustrated exemplary embodiment, a portion of the plurality of extension portions 135 of the common voltage line 131 of the liquid crystal display overlap the first contact hole 184 for the electrical connection between the common voltage line 131 and the common electrode 270, and a portion of the extension portions 135 overlap the spacer 325. Further, by not defining the common contact hole for the electrical connection between the common voltage line 131 and the common electrode 270 at the position where the spacer 325 is disposed, the step of the lower part of the spacer 325 is effectively reduced, thereby assisting in the stable disposition of the spacer 325. In addition, by providing the spacer 325 not to overlap the gate lines 121a and 121b, the step of the lower layer of the spacer 325 is effectively reduced, thereby assisting in the stable disposition of the spacer 325.

In the liquid crystal display according to the illustrated exemplary embodiment, by disposing the spacer 325 for maintaining an interval between the lower display panel 100 and the upper display panel 200 at a position overlapping a portion of the plurality of extension portions 135 of the common voltage line 131, it is not required to effectively prevent a light leakage of the area where the spacer 325 is disposed by using a separate light blocking member, thereby effectively preventing deterioration of an aperture ratio of the liquid crystal display.

The liquid crystal layer 3 between the lower display panel 100 and the upper display panel 200 includes a liquid crystal molecule (not shown), and the liquid crystal molecule may be oriented such that a long axis thereof is substantially parallel to surfaces of the two display panels 100 and 200 in a state where there is no electric field.

The first repair patterns 31a of the liquid crystal display according to an exemplary embodiment of the invention will be described in more detail with reference to FIG. 12.

The plurality of first repair patterns 31a protrudes from the common voltage line 131. The plurality of first repair patterns 31a overlaps the common electrode 270 and the pixel electrode 191 in a third area C.

As described above, the liquid crystal display according to an exemplary embodiment of the invention includes the plurality of first repair patterns 31a expanding from the common voltage line 131. Since the plurality of first repair patterns 31a includes a metal which is relatively thicker than a transparent conductor and resists heat, the first repair patterns 31a are left without being removed when the pixel electrode 191 and the common electrode 270 are short circuited by using a laser. Accordingly, the repair by applying the common voltage to the pixel electrode 191 of the bad pixel may be made by applying laser to the first area A where the plurality of first repair patterns 31a is defined and the pixel electrode 191 and the common electrode 270 overlap each other and causing the short circuit between the common electrode 270 and the pixel electrode 191, and the first repair patterns 31a.

Further, as described above, the plurality of first repair patterns 31a is disposed close to the second gate line 121b, and thus disposed in a peripheral edge part of the pixel area having relative low brightness. Accordingly, transmittance deterioration of the liquid crystal display may be effectively reduced in comparison with a case where the plurality of first repair patterns 31a is disposed on a center part of the pixel area having relatively high brightness.

It is preferable that the plurality of first repair patterns 31a has minimum sizes which can be repaired using laser, and a horizontal size and a vertical size of the plurality of first repair patterns 31a may be, for example, about 3 μm.

As described above, the liquid crystal display according to an exemplary embodiment of the invention may include the plurality of first repair patterns 31a expanding from the common voltage line 131 to repair the generated bad pixels by making the short circuit between the pixel electrode 191 and the common electrode 270 which overlap each other with the second passivation layer 180b therebetween and include a relatively thin transparent conductor and the first repair patterns 31a. Further, transmittance deterioration of the liquid crystal display due to the first repair patterns 31a can be effectively prevented by defining the first repair patterns 31a at a peripheral edge area of the pixel area having relative low brightness.

The first repair patterns 31a of the liquid crystal display according to the illustrated exemplary embodiment overlap the pixel electrode 191 and the common electrode 270, but the first repair patterns 31a may overlap the pixel electrode 191 and may not overlap the common electrode 270 in a liquid crystal display according to another exemplary embodiment of the invention. At this time, the first repair patterns 31a extend from the common voltage line 131 to receive the common voltage. Accordingly, when the bad pixel is generated, the repair can be made such that the pixel electrode 191 receives the common voltage through the short circuit between the pixel electrode 191 and the first repair patterns 31a.

In addition, the liquid crystal display according to an exemplary embodiment of the invention may include the common voltage line 131 connected to the common electrode 270 to effectively reduce a signal delay of the common voltage applied to the common electrode 270 and effectively reduce the number of data lines, thereby effectively reducing costs of a driver of the liquid crystal display.

Many characteristics of the liquid crystal display according to the exemplary embodiment described with reference to FIGS. 2 to 5 are all applicable to the liquid crystal display according to the illustrated exemplary embodiment described with reference to FIGS. 9 to 12.

Figure 13:
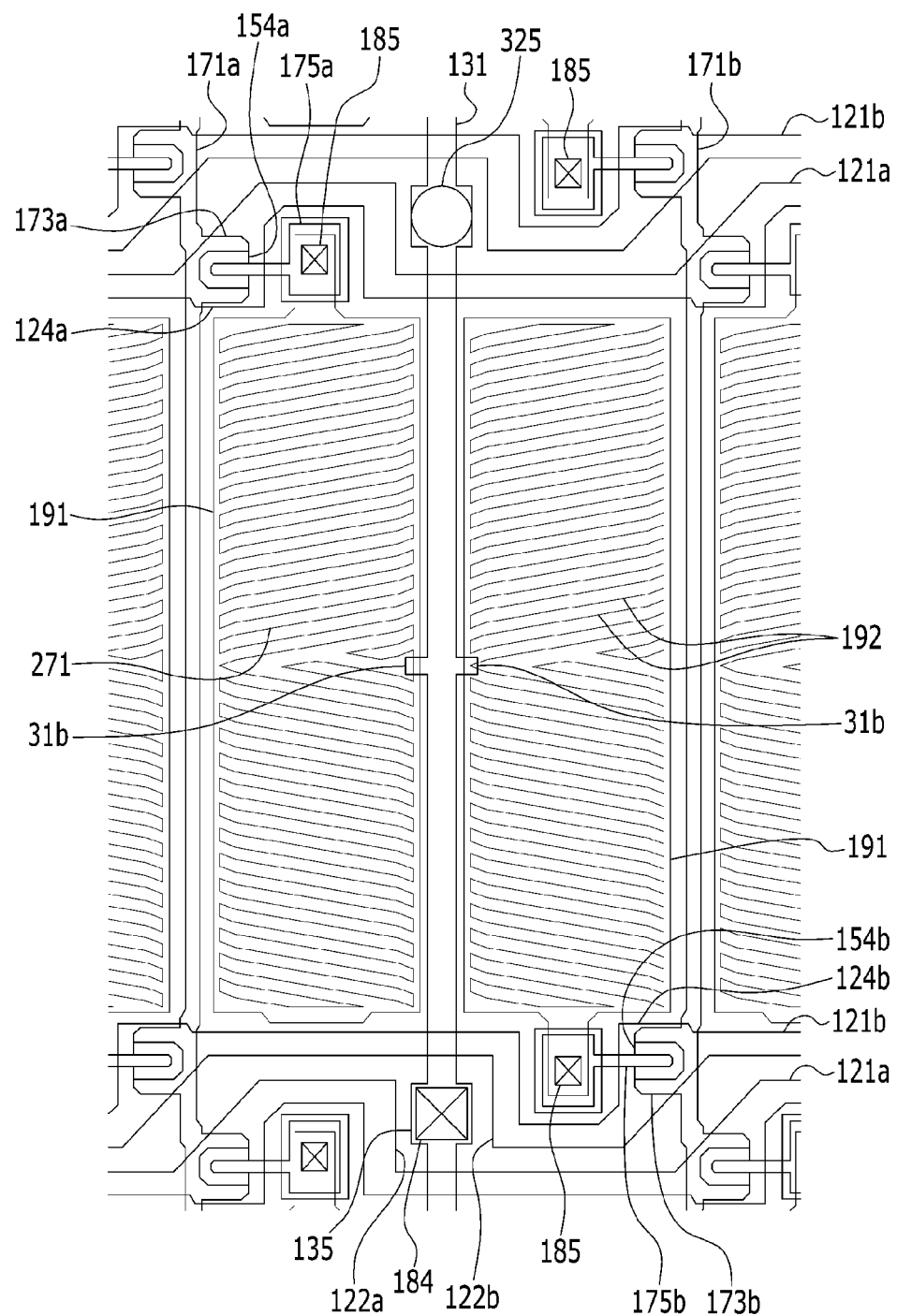
FIG. 13 is a plan view of another exemplary embodiment of a liquid crystal display according to the invention.

Then, a liquid crystal display according to another exemplary embodiment of the invention will be described with reference to FIG. 13. FIG. 13 is a plan view of a liquid crystal display according to another exemplary embodiment of the invention.

Referring to FIG. 13, the liquid crystal display according to the illustrated exemplary embodiment is substantially similar to the liquid crystal display according to the exemplary embodiment described with reference to FIGS. 9 to 12. Detailed descriptions of the same components will be omitted.

The liquid crystal display according to the illustrated exemplary embodiment includes a plurality of second repair patterns 31b disposed in a center part of the pixel area unlike the liquid crystal display according to the exemplary embodiment described with reference to FIGS. 9 to 12. The plurality of second repair patterns 31b may extend from the common voltage line 131.

The plurality of second repair patterns 31b overlaps the common electrode 270 and the pixel electrode 191.

The plurality of second repair patterns 31b of the liquid crystal display according to the illustrated exemplary embodiment overlaps the pixel electrode 191 and the common electrode 270, the plurality of second repair patterns 31b may overlap the pixel electrode 191 and may not overlap the common electrode 270 in a liquid crystal display according to another exemplary embodiment of the invention. At this time, the second repair patterns 31b extend from the common voltage line 131 to receive the common voltage. Accordingly, when the bad pixel is generated, the repair can be made such that the pixel electrode 191 receives the common voltage through the short circuit between the pixel electrode 191 and the second repair patterns 31b.

The plurality of second repair patterns 31b is disposed at the center part of the pixel area, but disposed at an area which does not overlap the plurality of second branch electrodes 192 of the pixel electrode 191. A part of the pixel area where the plurality of second branch electrodes 192 of the pixel electrode 191 is disposed is a relatively bright part. Accordingly, since the plurality of second repair patterns 31b is disposed at a relatively dark area, transmittance deterioration of the liquid crystal display due to the second repair patterns 31b can be effectively prevented.

Many characteristics of the liquid crystal display according to the exemplary embodiment described with reference to FIGS. 1 and 2 to 5 and the liquid crystal display according to the exemplary embodiment described with reference to FIGS. 9 to 12 are all applicable to the liquid crystal display according to the illustrated exemplary embodiment described with reference to FIG. 12.

Figure 14:
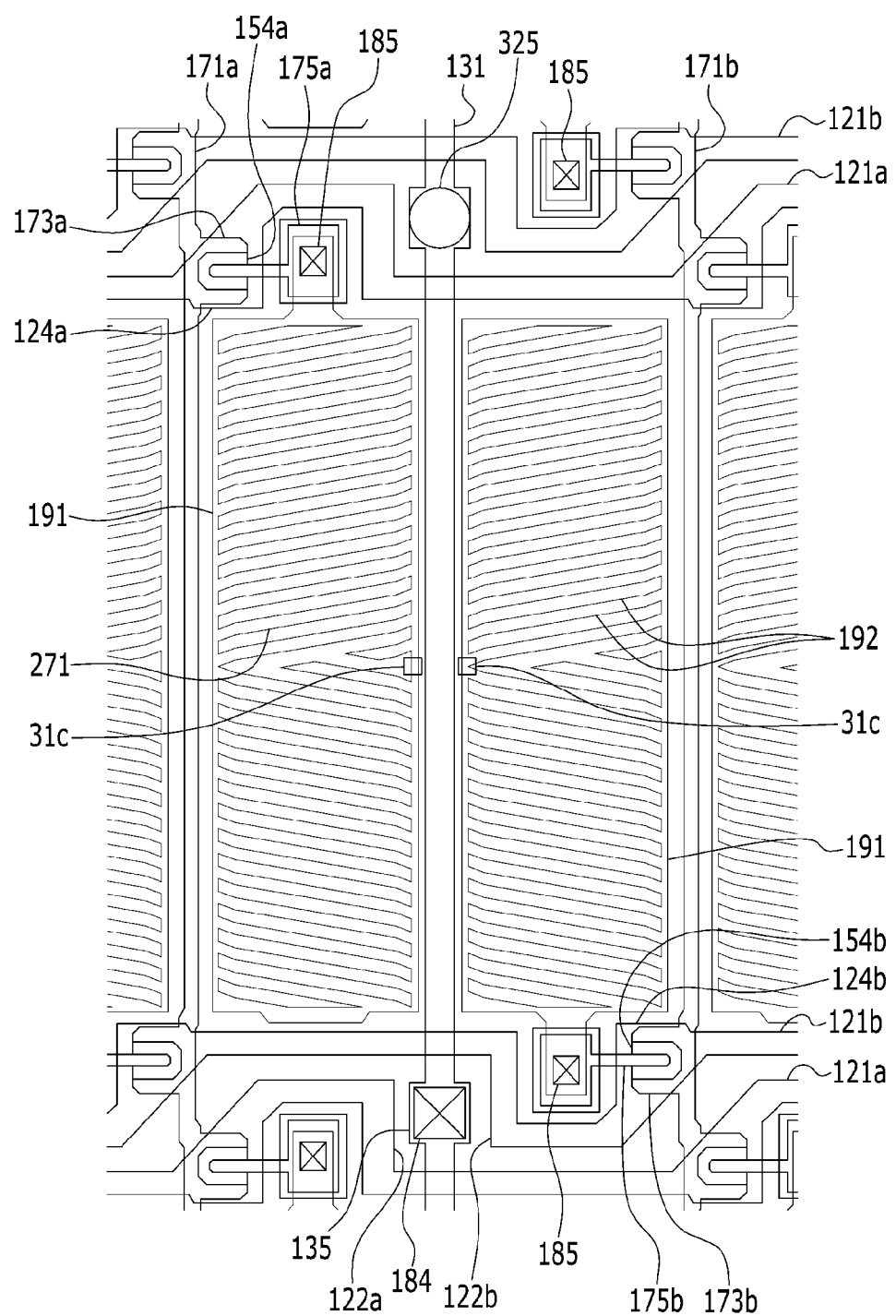
FIG. 14 is a plan view of another exemplary embodiment of a liquid crystal display according to the invention.

Then, a liquid crystal display according to another exemplary embodiment of the invention will be described with reference to FIG. 14. FIG. 14 is a plan view of a liquid crystal display according to another exemplary embodiment of the invention.

The liquid crystal display according to the illustrated exemplary embodiment is similar to the liquid crystal display according to the exemplary embodiment described with reference to FIGS. 9 to 12. Detailed descriptions of the same components will be omitted.

Unlike the liquid crystal display according to the exemplary embodiment described with reference to FIGS. 9 to 12, the liquid crystal display according to the illustrated exemplary embodiment includes the plurality of third repair patterns 31c separated from the common voltage line 131 and including the same layer as that of the gate lines 121a and 121b.

The plurality of third repair patterns 31c overlaps the pixel electrode 191 and the common electrode 270.

The plurality of third repair patterns 31c is disposed at a center part of the pixel area, but disposed at an area which does not overlap the plurality of second branch electrodes 192 of the pixel electrode 191A part of the pixel area where the plurality of second branch electrodes 192 of the pixel electrode 191 is disposed is a relatively bright part. Accordingly, since the plurality of third repair patterns 31c is disposed at a relatively dark area, transmittance deteriorate of the liquid crystal display due to the third repair patterns 31c can be effectively prevented.

The plurality of third repair patterns 31c of the liquid crystal display according to the illustrated exemplary embodiment is disposed at the center part of the pixel area, but the third repair patterns 31c may be disposed at a peripheral edge part of the pixel area having relatively low brightness in a liquid crystal display according to another exemplary embodiment of the invention.

Many characteristics of the liquid crystal display according to the exemplary embodiment described with reference to FIGS. 1 and 2 to 5 and the liquid crystal display according to the exemplary embodiment described with reference to FIGS. 9 to 12 are all applicable to the liquid crystal display according to the illustrated exemplary embodiment described with reference to FIG. 14.

As described above, according to the liquid crystal display according to an exemplary embodiment of the invention, it is possible to repair the bad pixel while effectively preventing aperture ratio deterioration of the liquid crystal display and effectively reduce the number of data lines while effectively reducing a signal delay of the common voltage line, so as to effectively reduce costs of a driver of the liquid crystal display.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
    an insulation substrate;
    a gate line and a data line disposed on the insulation substrate;
    a common voltage line disposed on the insulation substrate and including a first side facing the data line and a second side opposite to the first side, wherein a length of the common voltage line extends in a direction which is substantially parallel to a direction in which a length of the date line extends;
    a repair pattern extending from the first side and the second side of the common voltage line of the common voltage line;
    a first passivation layer disposed on the gate line, the data line and the repair pattern; and
    a pixel electrode and a common electrode which is disposed on the first passivation layer and which overlap each other; and
    a second passivation layer disposed between the pixel electrode and the common electrode,
    wherein the repair pattern extending in a direction different from a length direction of the data line overlaps the pixel electrode.

2. The liquid crystal display of claim 1, wherein:
    the common voltage line and the repair pattern are in a same layer as that of the data line.

3. The liquid crystal display of claim 2, further comprising a plurality of data lines,
    wherein:
    the common voltage line is disposed between two data lines which neighbor each other and extends in a direction substantially parallel to the two data lines.

4. The liquid crystal display of claim 3, further comprising a plurality of pixel electrodes,
    wherein:
    two pixel electrodes are disposed between the two data lines which neighbor each other.

5. The liquid crystal display of claim 4,
    further comprising:
    an opposing substrate facing the insulation substrate, and
    a spacer which is disposed between the opposing substrate and the insulation substrates and maintains an interval therebetween,
    wherein:
    the common voltage line includes a plurality of extension portions,
    a contact hole is defined in at least one of the first passivation layer and the second passivation layer,
    a portion of the plurality of extension portions of the common voltage line overlaps the contact hole, and
    a portion of the plurality of extension portions overlaps the spacer.

6. The liquid crystal display of claim 2, wherein:
    the repair pattern is disposed at a part adjacent to an edge of the pixel electrode and adjacent to the gate line.

7. The liquid crystal display of claim 2, wherein:
    one of the pixel electrode and the common electrode has a planar shape and the other one includes a plurality of branch electrodes, and
    the repair pattern is disposed between adjacent ones of the plurality of branch electrodes.

8. The liquid crystal display of claim 7, wherein:
the repair pattern is disposed at a center part of the pixel electrode.

9. The liquid crystal display of claim 1, wherein:
the repair pattern overlaps the common electrode.

10. The liquid crystal display of claim 9, wherein:
the common voltage line and the repair pattern are in a same layer as that of the data line.

11. The liquid crystal display of claim 10, further comprising a plurality of data lines,
wherein:
the common voltage line is disposed between two data lines which neighbor each other and extends in a direction substantially parallel to the two data lines.

12. The liquid crystal display of claim 11, further comprising a plurality of pixel electrodes,
wherein:
two pixel electrodes are disposed between the two data lines which neighbor each other.

13. The liquid crystal display of claim 12, further comprising:
an opposing substrate facing the insulation substrate, and
a spacer which is disposed between the opposing substrate and the insulation substrates and maintains an interval therebetween wherein:
the common voltage line includes a plurality of extension portions,
a contact hole is defined in at least one of the first passivation layer and the second passivation layer,
a portion of the plurality of extension portions of the common voltage line overlaps the contact hole, and
a portion of the plurality of extension portions overlaps the spacer.

14. The liquid crystal display of claim 10, wherein:
the repair pattern is disposed at a part adjacent to an edge of the pixel electrode and adjacent to the gate line.

15. The liquid crystal display of claim 10, wherein:
one of the pixel electrode and the common electrode has a planar shape and the other one includes a plurality of branch electrodes, and
the repair pattern is disposed between adjacent ones of the plurality of branch electrodes.

16. The liquid crystal display of claim 15, wherein:
the repair pattern is disposed at a center part of the pixel electrode.

17. The liquid crystal display of claim 1, wherein:
the repair pattern is in a same layer as that of the gate line.

18. The liquid crystal display of claim 17, wherein:
the repair pattern is disposed at a part adjacent to an edge of the pixel electrode and adjacent to the gate line.

19. The liquid crystal display of claim 17, wherein:
one of the pixel electrode and the common electrode has a planar shape and the other one includes a plurality of branch electrodes, and
the repair pattern is separated from the plurality of branch electrodes.

20. The liquid crystal display of claim 19, wherein:
the repair pattern is disposed at a center part of the pixel electrode.

21. The liquid crystal display of claim 17, wherein:
the repair pattern overlaps the common electrode.

* * * * *